US009235635B2

(12) United States Patent
Ittiachen

(10) Patent No.: US 9,235,635 B2
(45) Date of Patent: *Jan. 12, 2016

(54) SYSTEM AND METHOD FOR DISCOVERING STORY TRENDS IN REAL TIME FROM USER GENERATED CONTENT

(71) Applicant: Yahoo! Inc., Sunnyvale, CA (US)

(72) Inventor: Jebu Ittiachen, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 13/856,398

(22) Filed: Apr. 3, 2013

(65) Prior Publication Data

US 2013/0226560 A1  Aug. 29, 2013

Related U.S. Application Data

(63) Continuation of application No. 12/701,185, filed on Feb. 25, 2010, now Pat. No. 8,429,170.

(51) Int. Cl.
*G06F 17/30* (2006.01)
*G06F 7/00* (2006.01)
*G06F 17/27* (2006.01)

(52) U.S. Cl.
CPC ...... *G06F 17/30628* (2013.01); *G06F 17/2785* (2013.01); *G06F 17/30619* (2013.01); *G06F 17/30699* (2013.01)

(58) Field of Classification Search
CPC .................. G06F 17/30628; G06F 17/30619
See application file for complete search history.

(56) References Cited

U.S. PATENT DOCUMENTS

| 8,126,865 | B1 * | 2/2012 | Bharat et al. ................... 707/706 |
| 8,239,397 | B2 * | 8/2012 | Stefik et al. .................... 707/758 |
| 8,332,399 | B1 * | 12/2012 | Osinga ........................ 707/730 |
| 2003/0009531 | A1 * | 1/2003 | Richmann et al. ............ 709/213 |
| 2005/0165743 | A1 * | 7/2005 | Bharat et al. ...................... 707/3 |
| 2005/0198056 | A1 * | 9/2005 | Dumais et al. ................. 707/101 |
| 2005/0226511 | A1 * | 10/2005 | Short ............................ 382/225 |
| 2006/0242158 | A1 * | 10/2006 | Ursitti et al. ..................... 707/10 |
| 2007/0260586 | A1 * | 11/2007 | Savona et al. ...................... 707/3 |
| 2008/0092077 | A1 * | 4/2008 | Mather et al. .................. 715/781 |
| 2009/0048927 | A1 * | 2/2009 | Gross .............................. 705/14 |
| 2009/0064247 | A1 * | 3/2009 | Biniak et al. ................... 725/105 |
| 2009/0070346 | A1 * | 3/2009 | Savona et al. .................. 707/100 |
| 2010/0191741 | A1 * | 7/2010 | Stefik et al. .................... 707/748 |
| 2011/0047148 | A1 * | 2/2011 | Omoigui ........................ 707/723 |
| 2011/0153595 | A1 * | 6/2011 | Bernstein et al. ............. 707/722 |
| 2012/0254188 | A1 * | 10/2012 | Koperski et al. .............. 707/740 |

* cited by examiner

*Primary Examiner* — Jeffrey A Burke
(74) *Attorney, Agent, or Firm* — Martine Penilla Group, LLP

(57) ABSTRACT

A method for identifying story trends includes identifying a set of words in a fixed size data stream based on a subword cache, and electronically determining at least one story trend associated with the set of words and electronically generating a story hash associated with the set of words. The method also includes storing the story hash in a story trend cache and updating the story trend cache according to the story hash, and retrieving one or more popular story topics according to the story trend cache. Machine readable media including program code that causes execution of a method for generating search results also are described.

13 Claims, 5 Drawing Sheets

SYSTEM AND METHOD FOR DISCOVERING STORY TRENDS IN REAL TIME FROM USER GENERATED CONTENT

CROSS-REFERENCE TO RELATED APPLICATION

This application is a continuation of U.S. application Ser. No. 12/701,185, filed on Feb. 5, 2010. The disclosure of this prior application from which priority is claimed is incorporated herein by reference for all purposes.

FIELD OF THE INVENTION

The present invention generally relates to discovering trending stories in real time from user generated content. More specifically, the present invention are directed towards systems and methods for utilizing a multi-tier most heavily used ("MHU") cache environment for automatically identifying and ranking stories contain in user generated content such as real-time data streams.

BACKGROUND OF THE INVENTION

Emerging technologies focusing on user generated content have greatly increased the amount of data transmitted across the Internet on a daily basis. The growth of services allowing users to publish streams of data has allowed for expansive coverage of current events, news, topics and other data. However, the explosive influx of user-generated content provides significant problems in data analysis and aggregation. Furthermore, this influx of data provides for novel issues in extracting relevant topics due to the diversity of language, culture, slang and various other factors that affect the semantics of user-generated streams of data.

User generated data streams, when aggregated, allow for efficient discovery of hot news and trending topics. Previous efforts in aggregating user generated data streams have been to trend keywords in the data stream. This technique does not give a full view of why users are generating given keywords. The generated streams usually tend to break up the story depending on the user mood. For example, user generated streams directed to the same topic may vary as follows:

Stream 1: "eRay expected to announce deal to sell Skype"
Stream 2: "Ebay will announce deal to sell Skype to a group of investors on Tuesday"
Stream 3: "Big news tonight—"BREAKING: eBay to Announce Deal to Sell Skype"

Currently, the trends in these user generated streams are surfaced as "ebay", "announce deal", "sell skype", because users write about the same topics differently. The current state of the art fails to cohesively analyze user-generated streams to account for the variance in terminology used across a diverse data set. The present invention provides a solution allowing a system to intelligently parse and identify key trending topics and store topics or stories for subsequent analysis and retrieval.

SUMMARY OF THE INVENTION

The present invention is directed towards systems and methods for discovering story trends. The method of the present invention comprises receiving a data stream. In one embodiment, receiving a data stream may comprise receiving a user-generated data stream. In particular embodiments, the data stream may be of a fixed size (e.g., a fixed number of characters per user-generated content).

The method then identifies a first plurality of words within the data stream and generates a second set of words, wherein the second set of words comprises a plurality of words present in the data stream and present in a word cache. In one embodiment, identifying a first plurality of terms within the data stream may comprise splitting the receiving data stream at the word boundary, wherein identifying a first plurality of terms within the data stream further comprises ignoring a plurality of words shorter than a predetermined threshold.

The method then parses the second set of words and identifies a third set of words present within the second set and present within a subword cache. In one embodiment, parsing the second set of words may comprise ignoring a plurality of words based on pre-defined word characteristics wherein ignoring a plurality of words based on pre-defined word characteristics comprises ignoring prepositions within the second set of words.

In one embodiment, the method further comprises incrementing a counter in the word cache, the counter being associated with an identified word within the second set of words. In alternative embodiments, the method further comprises incrementing a counter in the subword cache, the counter associated with an identified word within the third set of words.

The method generates a story hash based on the third set of words and stores the story hash and the third set of words. In one embodiment, generating a story hash based on the third set of words may comprise generating a SimHash based on the third set of words. In an alternative embodiment, the method may further comprise receiving a request for stories from a user; calculating a hamming distance between identified story hashes; and providing a plurality of stories to the user.

The present invention further comprises a system for discovering story trends. The system comprises a plurality of client devices and a plurality of data sources coupled to a network. The system further comprises a web server operable to receive and transmit data to and from the client devices and data sources. In one embodiment the web server may be further operable to receiving a request for stories from a user and provide a plurality of stories to the user.

The system further comprises a word parser operable to receive a data stream, identify a first plurality of words within the data stream and generate a second set of words, wherein the second set of words comprises a plurality of words present in the data stream and present in a word cache. In one embodiment, the word parser is further operable to receive a user-generated data stream. In alternative embodiments, the word parser is further operable to split the receiving data stream at the word boundary and ignore a plurality of words shorter than a predetermined threshold.

The system further comprises a subword parser operative to parse the second set of words and identify a third set of words present within the second set and present within a subword cache. In one embodiment, the subword parser is further operable to ignore a plurality of words based on pre-defined word characteristics. In an alternative embodiment, the subword parser is further operable to ignore prepositions within the second set of words.

In one embodiment, the word parser is further operable to increment a counter in the word cache, the counter being associated with an identified word within the second set of words. In an alternative embodiment, the subword parser is further operable to increment a counter in the subword cache, the counter being associated with an identified word within the third set of words.

The system further comprises a hash calculator operable to generate a story hash based on the third set of words; a story cache operable to store the story hash; and a story lookup table operable to store the third set of words associated with the story hash. In one embodiment, the hash calculator is further operable to generate a SimHash based on the third set of words. In alternative embodiments, the system may further comprise a hamming distance calculator operable calculating a hamming distance between identified story hashes.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
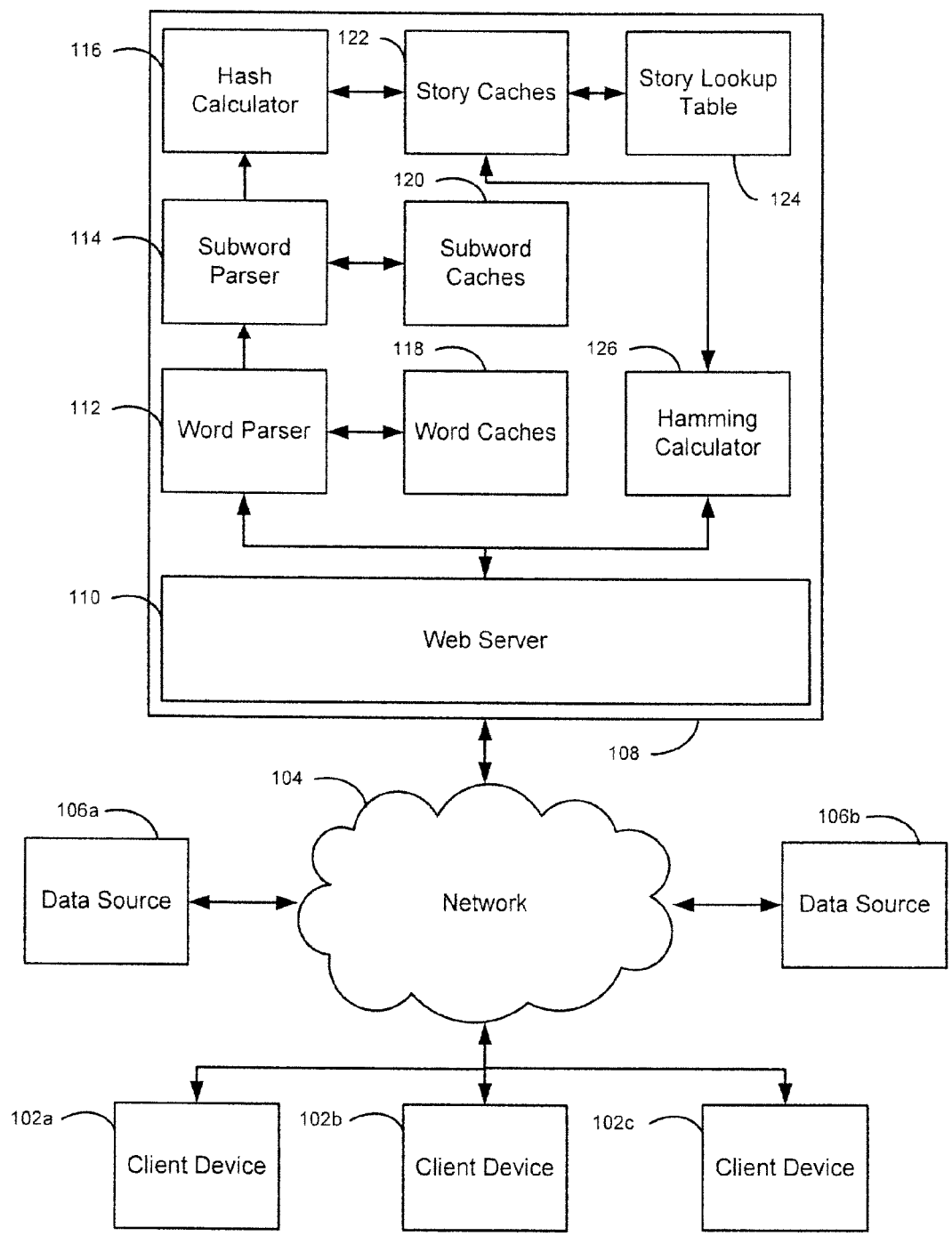
FIG. 1 presents a block diagram depicting a system for discovering trending stories in real time from user generated content according to one embodiment of the present invention.

FIG. 1 presents a block diagram illustrating one embodiment of a system for discovering trending stories in real time from user generated content. As the embodiment of FIG. 1 illustrates, a plurality or client devices 102a, 102b and 102c are electronically connected to a network 104. Network 104 is further electronically connected to data sources 106a, 106b and content provider 108. Content provider 108 comprises a plurality of hardware and software components including a web server 110, word parser 112, subword parser 114, hash calculator 116, word caches 118, subword caches 120, story cache 122, story lookup table 124 and hamming calculator 126.

Although illustrated as single, discrete components, alternative embodiments exist wherein the illustrated devices may be distributed across multiple hardware devices. Additionally, the devices may be distributed geographically in addition to physically.

In the illustrated embodiment, a plurality of client devices 102a, 102b, 102c may be operative to transmit data through network 104 to data sources 106a, 106b and content provider 108. In one embodiment, data sources 106a, 106b may comprise third party data aggregators operative to receive data from client devices 102a, 102b, 102c and store, process and present the data to client devices 102a, 102b, 102c. For example, data sources 106a and 106b may be operative to receive data such as text strings submitted by a user such as status updates, hyperlinks, story titles, etc. That is, data may comprise an updated such as "going to the movie" indicating user status; "ebay to announce skype deal: http://example-.com" indicating news stories; or various other discrete data. In alternative embodiments, client devices 102a, 102b, 102c may transmit real-time data streams to content provider 108, wherein content provider 108 may store, process and present data to other client devices 102a, 102b, 102c.

In the illustrated embodiment, content provider 108 comprises the web server 110, operative to handle incoming and outgoing web requests. Web server 110 may comprise a combination of server hardware (e.g., single or clustered servers comprising physical storage devices) and server software (e.g., Apache HTTP Server, Microsoft IIS, etc.).

Web server 110 may be configured to actively crawl data sources 106a, 106b to surface real time data streams, wherein surfacing real time data streams comprises extracting the data streams from a large dataset, such as the Internet. In one embodiment, web server 110 may be configured to access data from data sources 106a, 106b via application programming interfaces ("API") provided by data sources 106a, 106b. Alternatively, web server 110 may surface data using techniques commonly known in the art of search engine indexing. In a further embodiment, web server 110 may be communicatively coupled to one or more application servers (not shown) operative to store executable software for surfacing of real-time data streams.

Web server 110 may transmit incoming data streams to word parser 112. In the illustrated embodiment of FIG. 1, word parser 112 splits the incoming data streams at the word boundary and ignores identified words that are shorter than a pre-defined threshold (for example, but not limited in nature, words shorter than three characters). In alternative embodiments, word parser 112 may remove commonly occurring words, also known as stopwords. After the word parser 112 identifies a plurality of words within the data stream, the word parser 112 queries the word cache 118 to determine if the words have been previously identified.

In the illustrated embodiment, word cache 118 may implement a most heavily used ("MHU") cache scheme, wherein the most heavily identified words in the data stream are stored. For example, word cache 118 may store a plurality of terms and the number of times the term has been identified in an incoming data stream. In particular embodiments, word cache 118 may further store the word position of a given word, that is, the position of a word within a textual fragment. In one embodiment, a MHU cache may comprise a plurality of fields including, but not limited to, an index value, counter value and data value. The index value may uniquely identify a given data value in the cache, while a counter value may be a constantly incremented and decremented value. The counter value may be incremented and decremented based on occurrences in a plurality of data streams. Additionally, MHU cache may be configured to have a maximum size, wherein only those values with the highest N counter values are kept while the data associated with the lowest counter values are discarded as other counter values are incremented.

After identifying a first list of words present within the word caches 118, the word parser 112 passes the first list to subword parser 114. In one embodiment, the subword parser 114 removes a plurality of words from the first list of parsed words. For example, subword parser 114 may remove all prepositions within the first list. Subword parser 114 may first determine if the words are present within the subword caches 120. If the words are not present, and space is available, the subword parser 114 may initialize a cache entry with a given word. Subword parser 114 may then determine whether the parsed words appear within the subword caches 120. For each word found within the subword caches 120, the subword parser 114 may increment an identified count for the given word.

In particular embodiments, word caches 118 and subword caches 120 may comprise similar or identical schemas. In particular, both caches 118 and 120 may store a case-insensitive word or term, a position identifier and an increment counter. For example, a word cache 118 may utilize the following schema:

TABLE 1

| Cache Key | Index | Counter |
|---|---|---|
| thousands | 1 | 230 |
| protestors | 2 | 562 |
| clash | 3 | 450 |
| during | 4 | 428 |
| iran | 5 | 1851 |
| election | 6 | 739 |

Similarly, subword caches may share a similar schema:

TABLE 2

| Cache Key | Index | Counter |
|---|---|---|
| thousands | 1 | 230 |
| protestors | 2 | 562 |
| clash | 3 | 450 |
| iran | 4 | 1851 |
| election | 5 | 739 |

As illustrated in Tables 1 and 2, subword cache 120 may comprise a pruned subset of word cache 118 based on various textual metrics such as the exclusion of prepositions or other words.

After determining the relevant words in a data stream, the subword parser 114 transmits the filtered words to a hash calculator 116. Hash calculator 116 is operative to generate a unique hash value for the filtered, relevant terms. In one embodiment, hash calculator 116 uses a SimHash algorithm to determine the unique hash for a given word list. In certain embodiments, the hash calculator may ignore the word position of a given word. In alternative embodiments, hash calculator 116 may include the word position when generating a hash value.

Hash calculator 116 transmits the hashed data to story caches 122. In the illustrated embodiment, story caches 122 employ a similar structure to word caches 116 and subword caches 120. In contrast to caches 118 and 120, story cache 122 may be operative to store at least the hashed value of the identified word list and a counter value. Additionally, hash calculator 116 may transmit the hashed value and the associated word list to story lookup table 124.

Web server 110 may additionally be operative to retrieve stories from story caches 122. Web server 110 may transmit a request for stories to hamming calculator 126 which, in turn, is operative to analyze hash values stored in story caches 122. In the illustrated embodiment, hamming calculator 126 calculates the hamming distance between stored hash values to merge related stories based on the proximity of the hash values. Alternatively, web server 110 may send requests directly to story caches 122, which may indirectly request the hamming calculator 126 to calculate a distance.

Hamming calculator 126 may perform this merging at run time or on an ad hoc basis as entries are stored in story caches 122. Accordingly, hamming calculator 126 may retrieve a result set including the most popular story topics from story caches 122, along with the associated human readable word list stored in story lookup table 124.

As described, the above system of FIG. 1 operates to identify the most popular story trends in a user-generated content realm. Further detail and variations of the system methods are described with respect to FIGS. 2 through 5.

Figure 2:
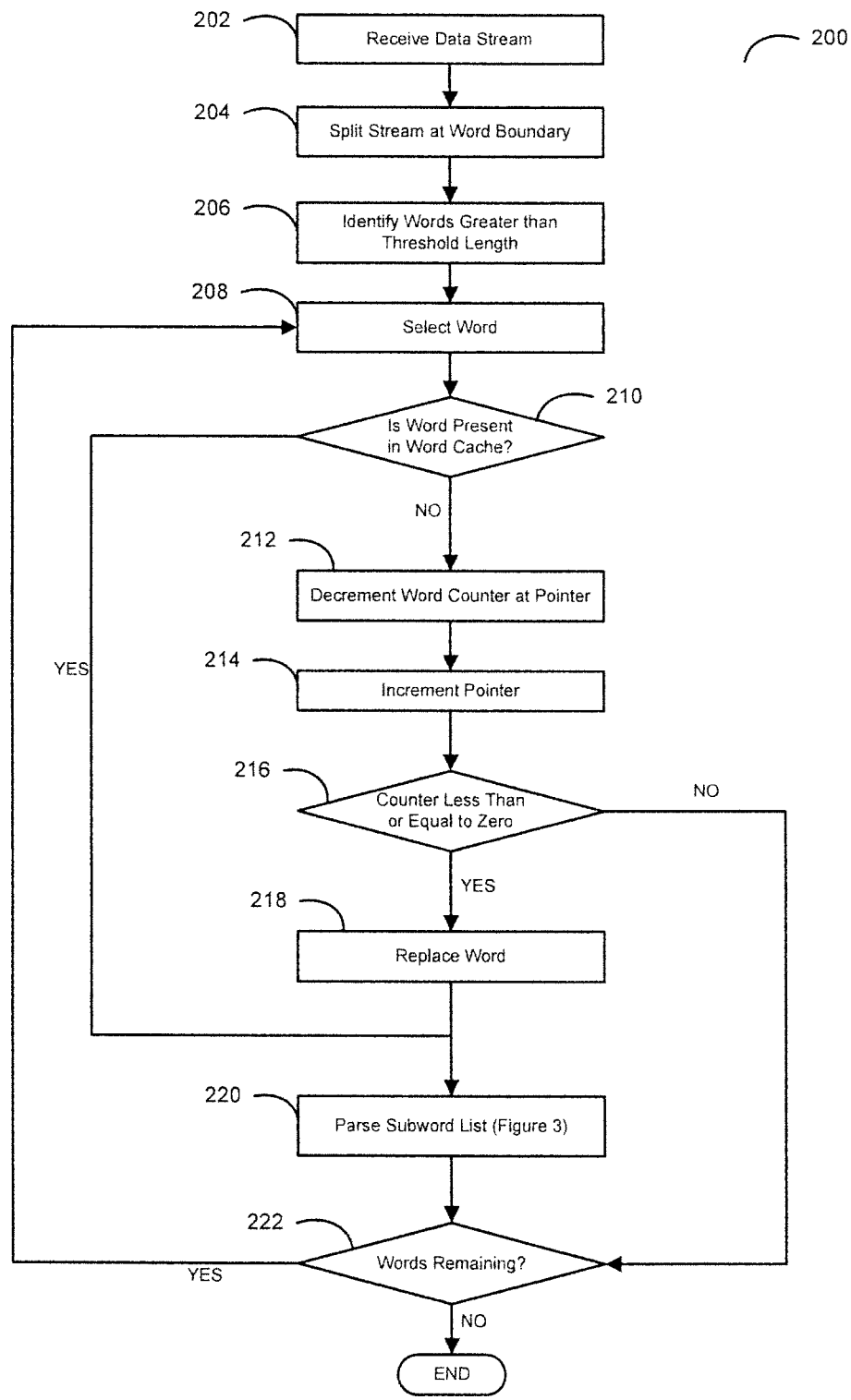
FIG. 2 presents a flow diagram illustrating a method for identifying heavily used terms within a user generated data stream according to one embodiment of the present invention.

FIG. 2 presents a flow diagram illustrating a method for identifying heavily used terms within a user generated data stream according to one embodiment of the present invention. The method 200 described herein may be performed using the system of FIG. 1, including the methods steps being performed by the content provider 108 and subcomponents in communication with data sources 106a, 106b and client devices 102a, 102b, 102c. As the embodiment of FIG. 2 illustrates, the method 200 receives a data stream, step 202. In one embodiment, a data stream may comprise a real-time flow of textual data such as user status messages, RSS feeds, real-time news stories, etc. In one embodiment, a data stream may comprise a fixed-length data stream comprising a plurality of characters not exceeding a predetermined threshold number of characters. Method 200 may receive data streams as a pure stream, or alternatively, may receive messages via a push or pull mechanism (e.g., actively monitoring sources of data).

In response to receiving data via the data stream, the method splits the stream at the word boundary, step 204, and identifies words greater than a predetermined threshold. In one embodiment, the method 200 may identify only those words greater than three characters, however other character threshold levels may be envisioned.

The method 200 then selects an identified word, step 208, and for each word in the data stream, determines if that word is present within a first level word cache, step 210. In one embodiment, the first level word cache may be of a fixed size (e.g., fixed number of records). In this embodiment, the method 200 first determines if the word has been previously identified. If it has, the method 200 increments a counter associated with how many times the word has been found. If the word is not found, the method 200 may then determine if the word cache is full. If the word cache is not full, the method 200 may insert the word into the word cache. Alternatively, if the word cache has been filled, the method 200 may determine if the word should replace an existing word within the word cache as discussed further herein.

If the method 200 determines that the word is present within the word cache, step 210, the method 200 then parses a subword list associated with the word, step 220. In one embodiment, the method 200 may increment a word counter in a word cache if the word is identified in step 210. One embodiment of a method for parsing a subword list is described with respect to FIG. 3.

If the method 200 determines that the word is not present in the word cache at the pointer location, step 210, the method decrements a word counter at the given pointer position, step 212, and increments the pointer 214. In one embodiment, decrementing a word counter at a given position may comprise decrementing an integer value representing the number of times a given word has been identified at a position indicated by the pointer.

The method 200 then determines if the decremented word counter results in a negative or zero value, step 216. If the method 200 has decremented the word counter to zero or below, the method 200 replaces the word, step 218. If the counter is greater than zero, the method 200 continues to parse the incoming words, step 222. In one embodiment, replacing a word may comprise swapping the word value at the given pointer location and initializing the counter to one. After inserting a new word, the method 200 then initializes the subword list associated with the given word, step 220.

Figure 3:
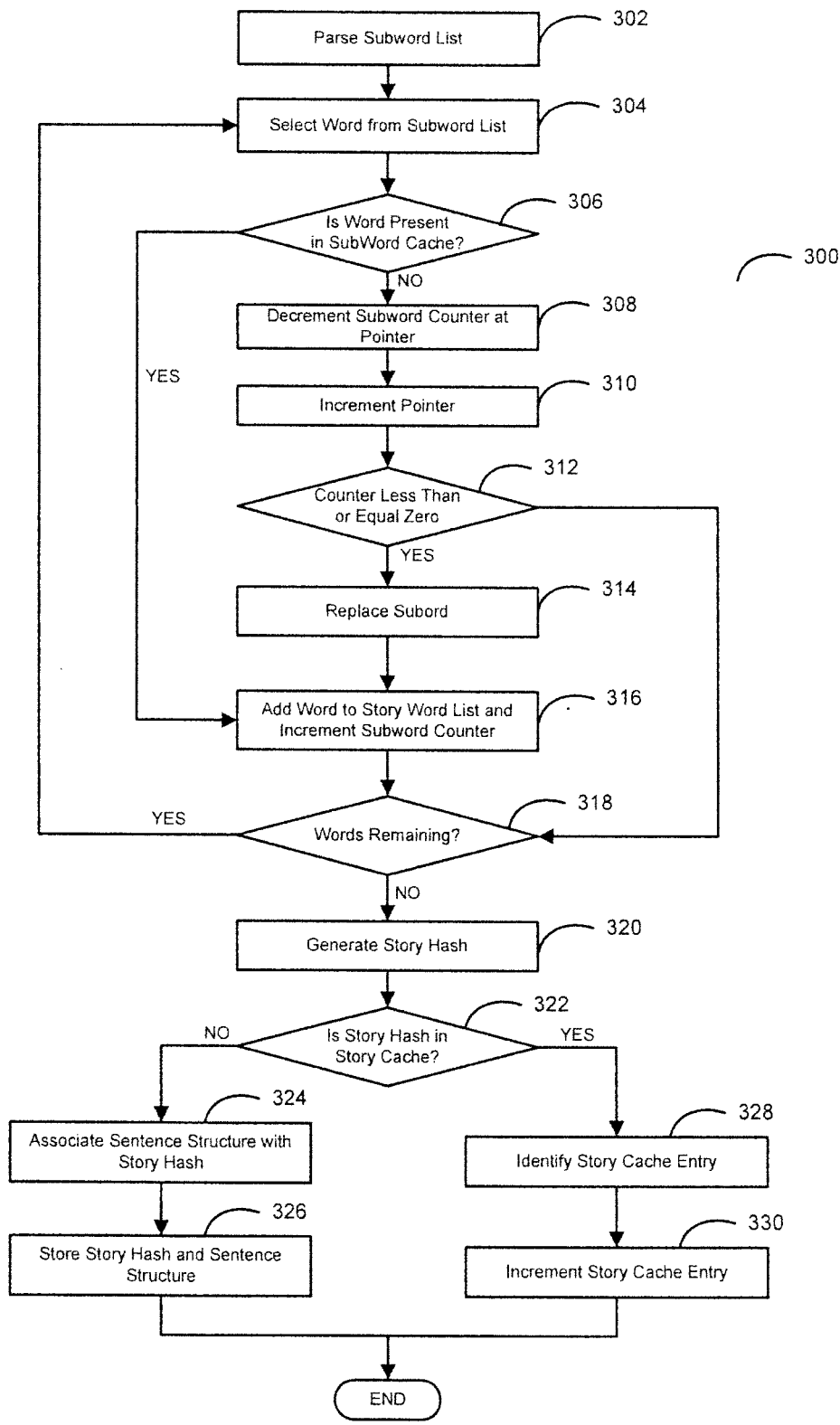
FIG. 3 presents a flow diagram illustrating a method for storing stories derived from user generated data streams according to one embodiment of the present invention.

FIG. 3 presents a flow diagram illustrating a method for storing stories derived from user generated data streams according to one embodiment of the present invention. The method 300 described herein may be performed using the system of FIG. 1, including the methods steps being performed by the content provider 108 and subcomponents in communication with data sources 106a, 106b and client devices 102a, 102b, 102c. As the embodiment of FIG. 3 illustrates, the method 300 receives a subword list from the method 200.

The method 300 first parses the data stream for subwords, step 302. In the illustrated embodiment, parsing a subword list may comprise removing a plurality of words from the data stream, such as prepositions. Alternatively, parsing the subword list may comprise other parsing techniques such as word replacement, spell checking, or other text parsing techniques known in the art.

The method 300 then selects a given subword, step 304, and determines if the subword is present within a subword cache, step 306. In one embodiment, the method 300 determines if a subword is present in the subword cache by determining that a subword at the same position in the stream exists within the subword cache. If the method 300 determines that a subword is present within the cache, the method 300 adds the subword to a story word list and increments a counter associated with the subword in the subword cache, step 316.

If the method 300 determines that the subword is not present in the word cache at the pointer location, step 306, the method decrements a subword counter at the given pointer position, step 308, and increments the pointer 310. In one embodiment, decrementing a subword counter at a given position may comprise decrementing an integer value representing the number of times a given word has been identified at a position indicated by the pointer.

The method 300 then determines if the decremented subword counter results in a negative or zero value, step 312. If the method 300 has decremented the word counter to zero or below, the method 300 replaces the word, step 314. If the counter is greater than zero, the method 300 continues to parse the incoming words, step 318. In one embodiment, replacing a subword may comprise swapping the word value at the given pointer location and initializing the counter to one.

The method 300 determines if any subwords remain in the received subword list, step 318. If subwords remain, the method 300 repeats steps 304, 306, 308, 310, 312, 314 and 316 for the remaining subwords. After analyzing the received subwords, the method 300 generates a story hash for the identified story word list, step 320. In one embodiment, generating a story hash comprises generating a unique identifier for a given story word list. The story hash may ignore the word position of a given story word list. In alternative embodiments, the story hash may include the word positions.

The method 300 then determines whether the story hash has previously been included in a story cache, step 322. If the story hash has not been stored within the story cache, the method 300 associates a sentence structure with the story word list, step 324. In the illustrated embodiment, associating a sentence structure with a story word list may comprise storing the story hash in a lookup table wherein the story hash has a one to one relationship with a particular sentence structure. The method 300 at step 324 may perform a similar operation as discussed with respect to steps 308, 310, 312 and 314. That is, the method 300 may inspect a story hash entry at a given position. If the story hash is found, the method 300 may increment a story hash counter. If the story hash is not found, the method 300 may decrement a story hash counter. If the counter is less than or equal to zero, the method 300 may then replace and initialize a new story cache entry at a given position. For example, a given hash value may be associated with a list of words and word positions. The method 300 then inserts the story hash into the story cache and inserts the sentence structure into a story lookup table, step 326. Additionally, the method 300 initializes a story counter to one.

If the method 300 determines that the generated story hash has previously been identified, the method 300 identifies the story cache entry, step 328, and increments a story cache entry counter associated with the story hash, step 330. In one embodiment, incrementing a story cache entry counter may comprise incrementing an integer value associated with a story cache entry.

Figure 4:
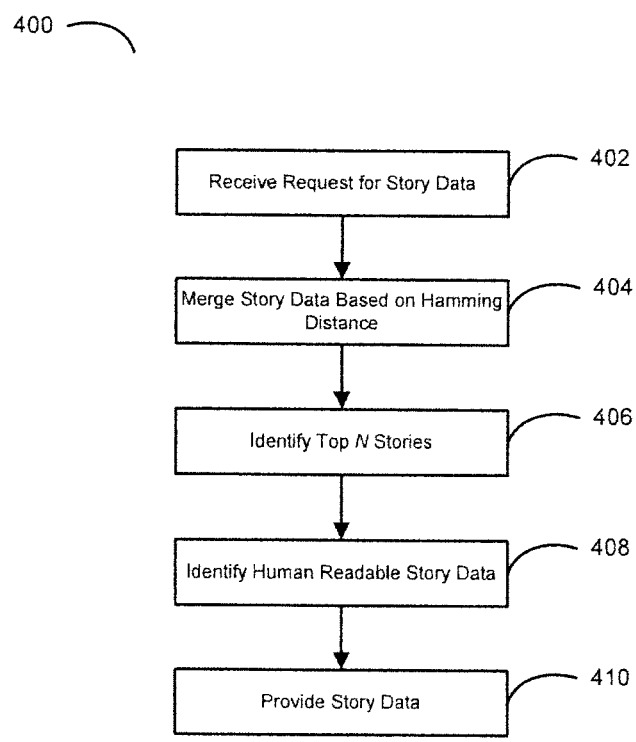
FIG. 4 presents a flow diagram illustrating a method for retrieving stories identified in a stream of user data according to one embodiment of the present invention.

FIG. 4 presents a flow diagram illustrating a method for retrieving stories identified in a stream of user data according to one embodiment of the present invention. The method 400 described herein may be performed using the system of FIG. 1, including the methods steps being performed by the content provider 108 and subcomponents in communication with data sources 106a, 106b and client devices 102a, 102b, 102c. As the embodiment of FIG. 4 illustrates, the method 400 receives a request for story data, step 402. In one embodiment, receiving a request for story data may comprise receiving a request from a user over a network, the request comprising a request for popular stories. Alternatively, the request may comprise a request for a plurality of stories associated with a given keyword.

The method 400 merges stories based on a hamming distance, step 404. In one embodiment, the method 400 may merge stories at runtime based on a user request. In alternative embodiments, the method 400 may merge stories prior to receiving a request from a user. The method 400 may employ various hamming distance algorithms known in the art to calculate the similarity between story cache entries. In this embodiment, the method 400 consolidates redundant story entries and provides a list of topical stories.

The method 400 then identifies the top N stores, step 406. In one embodiment, the method 400 may automatically determine the value of N. In alternative, embodiments, the method 400 may utilize a statically determined value of N. For example, the method 400 may select the top ten, most popular, story topics in response to a user request. In alternative embodiments, the method 400 may utilize various other metrics to reduce the set of stories presented to a user. For example, the method 400 may analyze time and date characteristics of the retrieved stories to identify the newest, or freshest, stories identified by users.

The method 400 then identifies human readable story data, step 408, and presents the human readable story data to a user, step 410. In the illustrated embodiment, the method 400 may access a story lookup table that stores both the story hash values and textual representation of a topic (e.g., a sentence describing the story).

Figure 5:
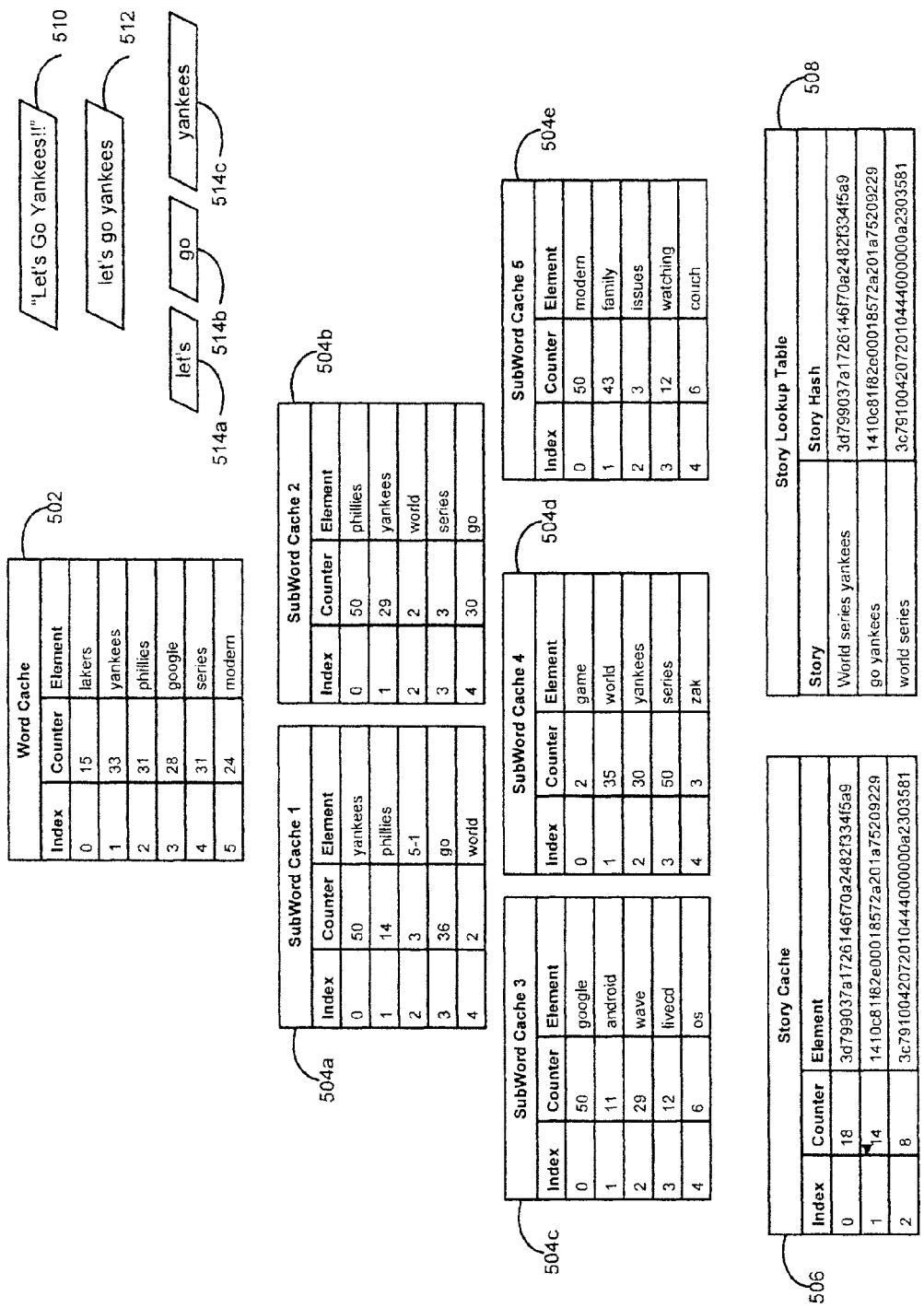
FIG. 5 presents a block diagram illustrating a plurality of most heavily used cache identifying story trends according to one embodiment of the present invention.

FIG. 5 presents a block diagram illustrating a plurality of most heavily used cache identifying story trends according to one embodiment of the present invention. According to the embodiment that FIG. 5 illustrates, a plurality of caches 502, 504a through e, 506 and 508 store term metrics associated with an incoming data stream. In the illustrated embodiment, the data present within FIG. 5 may be populated according to the previously describe methods.

As illustrated, a user submits a piece of user generated content (UGC) 510 containing the text "Let's Go Yankees!!". The UGC may be parsed according to a predefined algorithm. For example, the UGC 510 may be stripped of capitalization and certain punctuation (e.g., exclamation points, periods, colons, etc.). As illustrated in FIG. 5, the UGC 512 is parsed to "let's go yankees", removing capitalization and exclamation points.

As previously discussed, the UGC is then split at the word boundary to form discrete words 514a, 514b, 514c from the UGC. The method selects those words greater than a predetermined threshold, as previously discussed. In the illustrated embodiment, the method selects words greater than three characters: words 514a ("let's") and 514c ("yankees"). The method then inspects word cache 502 to determine whether words 514a or 514c are present. Word 514c is present within word cache 502, so the associated counter with word 514c is incremented at position 1.

As previously discussed, a plurality of subword caches 504a-e are associated with a word cache 502. Accordingly, subword cache 504a is associated with index 0 of word cache 502, subword cache 504b with index 1, and so forth. The method then parses the parsed words 514a, 514b, 514c according to a predefined schema. In the illustrated embodiment, the method selects all words that are not prepositions. In the illustrated embodiment, the method would select each word 514a, 514b, 514c.

The method then queries subword cache 504a to determine which words 514a, 514b, 514c are present within the subword cache 504a. In the illustrated embodiment, the method determines that words 514b and 514c are present within the word cache 504a. The method accordingly increments the counters associated with the words at positions 3 and 0, respectively.

Based on the identification of words within subword cache 504a, the method identifies a story as "go yankees". The method then generates a unique hash value associated with the story, as previously described, and inserts the hash within story cache 506 and increments the associated counter. Additionally, the method then stores the hash and associated story within a story lookup table, if the story hash is stored in the story cache 506 for the first time.

The presently described invention provides a novel system and method for surfacing real time data trends based on user-generated content. By using a multi-tier MHU system, the present invention is able to more efficiently identify popular topics and trends within immense, dense and rapidly changing data clouds, such as the user-generated content domain.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

I claim:

1. A computer-implemented method for identifying story trends, the method comprising:
    identifying a set of words in a fixed size data stream based on a subword cache;
    electronically determining at least one story trend associated with the set of words and electronically generating a story hash associated with the set of words;
    storing the story hash in a story trend cache and updating the story trend cache according to the story hash; and retrieving one or more popular story topics according to the story trend cache for presentation to a user.

2. The method of claim 1, wherein the data stream is a user-generated data stream.

3. The method of claim 1, wherein generating a story hash associated with the set of words comprises generating a SimHash based on the set of words.

4. The method of claim 1, further comprising:
receiving a request for stories from a user;
using the story hash to calculate a hamming distance between the story hash and another story hash; and
providing a story to the user based on a merger of the story hashes, if the hamming distance indicates that the story hashes are proximate.

5. The method of claim 4, wherein the merger occurs at run time.

6. Non-transitory machine readable media comprising program code that when executed by a programmable processor causes execution of a method for generating search results, the machine readable media including:
program code for identifying a set of words in a fixed size data stream based on a subword cache;
program code for determining at least one story trend associated with the set of words and generating a story hash associated with the set of words;
program code for storing the story hash in a story trend cache and updating the story trend cache according to the story hash; and
program code for retrieving one or more popular story topics according to the story trend cache for presentation to a user.

7. The machine readable media of claim 6, wherein the data stream comprises a user-generated data stream.

8. The machine readable media of claim 6, wherein generating a story hash associated with the set of words comprises generating a SimHash based on the set of words.

9. The machine readable media of claim 6, further comprising:
program code for receiving a request for stories from a user;
program code for using the story hash to calculate a hamming distance between the story hash and another story hash; and
program code for providing a story to the user based on a merger of the story hashes, if the hamming distance indicates that the story hashes are proximate.

10. The machine readable media of claim 9, wherein the merger occurs at run time.

11. A computer-implemented method for identifying story trends, the method comprising:
identifying a set of words in a fixed size data stream based on a subword cache;
electronically determining at least one story trend associated with the set of words and electronically generating a story hash associated with the set of words;
storing the story hash in a story trend cache and updating the story trend cache according to the story hash;
receiving a request for stories from a user;
using the story hash to calculate a hamming distance between the story hash and another story hash; and
providing a story to the user based on a merger at run time of the story hashes, if the hamming distance indicates that the story hashes are proximate.

12. The method of claim 11, wherein the data stream is a user-generated data stream.

13. The method of claim 11, wherein generating a story hash associated with the set of words comprises generating a SimHash based on the set of words.

* * * * *